US012647281B1

(12) United States Patent
Mangold

(10) Patent No.: US 12,647,281 B1
(45) Date of Patent: Jun. 2, 2026

(54) CRYPTOGRAPHIC WORK VERIFICATION SYSTEM FOR PATTERN-BASED RISK DETECTION

(71) Applicant: Fenris LLC, Twin Lakes, WI (US)

(72) Inventor: David G. Mangold, Twin Lakes, WI (US)

(73) Assignee: Fenris LLC, Twin Lakes, WI (US)

( * ) Notice: Subject to any disclaimer, the term of this patent is extended or adjusted under 35 U.S.C. 154(b) by 0 days.

(21) Appl. No.: 19/381,579

(22) Filed: Nov. 6, 2025

(51) Int. Cl.
H04L 9/32 (2006.01)
H04L 9/00 (2022.01)

(52) U.S. Cl.
CPC .......... H04L 9/3247 (2013.01); H04L 9/3231 (2013.01); H04L 9/50 (2022.05)

(58) Field of Classification Search
None
See application file for complete search history.

(56) References Cited

U.S. PATENT DOCUMENTS

| | | |
|---|---|---|
| 8,112,365 B2 | 2/2012 | Foster |
| 8,229,782 B1 | 7/2012 | Adams |
| 8,527,307 B2 | 9/2013 | Hamilton, II |
| 8,650,048 B1 | 2/2014 | Hopkins, III |
| 9,270,711 B1 | 2/2016 | Rowland |
| 9,584,526 B2 | 2/2017 | Williams |
| 10,147,147 B2 | 12/2018 | Himel |
| 10,657,479 B2 | 5/2020 | Griffin |
| 10,740,805 B2 | 8/2020 | Stovall |
| 11,424,908 B2 | 8/2022 | Bartolucci |
| 11,470,051 B1 | 10/2022 | Berkas |
| 11,681,879 B2 | 6/2023 | Ridgill, II |
| 11,882,225 B1 | 1/2024 | Griffin |
| 2003/0195857 A1 | 10/2003 | Acquisti |
| 2005/0076089 A1 | 4/2005 | Fonseca |
| 2007/0127693 A1 | 6/2007 | D'Ambrosio |

(Continued)

OTHER PUBLICATIONS

Singireddy, Sneha, "Applying Deep Learning to Mobile Home and Flood Insurance Risk Evaluation", American Advanced Journal for Emerging Disciplinaries (AAJED), vol. 1, Issue 1, ISSN: 3067-4190, Dec. 2024 (Year: 2024), 16 pages.

*Primary Examiner* — Ponnoreay Pich
(74) *Attorney, Agent, or Firm* — Sheppard Mullin Richter & Hampton LLP

(57) ABSTRACT

A computer-implemented method, computer program product, and a computer system for verifying organizational responses to detected safety patterns using role-dependent authentication and blockchain-anchored audit trails. The system receives pattern metadata containing a unique identifier and authenticates a first user via a dedicated authentication flow, enabling generation of a work order linked to the detected pattern. A second user may be authenticated through a distinct flow to complete specified tasks. As tasks and evidentiary requirements are fulfilled, they system may generate cryptographically signed updates that are linked to the second user's individual cryptographic wallet are recorded as on-chain events on an immutable distributed ledger, with collected evidence stored securely off-chain and referenced by the ledger. The system may further generate an exportable, cryptographically verifiable evidence package incorporating pattern metadata, work order parameters, and signed modifications.

20 Claims, 6 Drawing Sheets

(56) References Cited

U.S. PATENT DOCUMENTS

| 2013/0110399 | A1 | 5/2013 | Moss |
| 2014/0017646 | A1 | 1/2014 | Seitzberg, III |
| 2014/0074976 | A1 | 3/2014 | Greenberg |
| 2014/0132409 | A1 | 5/2014 | Billman |
| 2014/0244318 | A1 | 8/2014 | Drake |
| 2014/0257862 | A1 | 9/2014 | Billman |
| 2016/0027129 | A1 | 1/2016 | Pallaghy |
| 2016/0055442 | A1 | 2/2016 | Chadwick |
| 2016/0292789 | A1 | 10/2016 | Rajagopalan |
| 2017/0169390 | A1 | 6/2017 | Wesselink |
| 2017/0171297 | A1 | 6/2017 | Arzoumanian |
| 2018/0082238 | A1 | 3/2018 | Shani |
| 2018/0157995 | A1 | 6/2018 | O'Malley |
| 2019/0318265 | A1 | 10/2019 | Gould |
| 2020/0145498 | A1 | 5/2020 | Grayson |
| 2020/0160248 | A1 | 5/2020 | Harmon |
| 2020/0336907 | A1 | 10/2020 | Jain |
| 2021/0042854 | A1 | 2/2021 | Hazy |
| 2021/0312351 | A1 | 10/2021 | Pourmohammad |
| 2021/0390472 | A1 | 12/2021 | Amravatkar |
| 2022/0067665 | A1 | 3/2022 | Westerheide |
| 2022/0215744 | A1 | 7/2022 | Ton-That |
| 2022/0261758 | A1 | 8/2022 | Kim |
| 2023/0044173 | A1 | 2/2023 | Efrat |
| 2023/0083724 | A1* | 3/2023 | Cella ................. G06F 16/24537<br>705/28 |
| 2023/0162156 | A1 | 5/2023 | Mitchell |
| 2023/0316185 | A1 | 10/2023 | Lee |
| 2024/0144118 | A1 | 5/2024 | Gundlapalli |
| 2024/0185360 | A1 | 6/2024 | Kodidala |
| 2024/0261692 | A1* | 8/2024 | Sliwka ................. H04L 9/3213 |
| 2025/0078499 | A1 | 3/2025 | Simonelli |
| 2025/0095074 | A1 | 3/2025 | Ketharaju |
| 2025/0233743 | A1* | 7/2025 | Aldweesh ............ H04L 63/166 |

* cited by examiner

500

COMPUTER 501

PROCESSOR SET 510

| PROCESSING CIRCUITRY 520 | CACHE 521 |
|---|---|

COMMUNICATION FABRIC 511

VOLATILE MEMORY 512

PERSISTENT STORAGE 513

OPERATING SYSTEM 522

WORK VERIFICATION PROGRAM 110

MODEL552

PERIPHERAL DEVICE SET 514

| UI DEVICE SET 523 | STORAGE 524 | IoT SENSOR SET 525 |
|---|---|---|

NETWORK MODULE 515

WAN 502

END USER DEVICE 503

REMOTE SERVER 504

REMOTE DATABASE 530

PRIVATE CLOUD 506

GATEWAY 540

PUBLIC CLOUD 505

| CLOUD ORCHESTRATION MODULE 541 | HOST PHYSICAL MACHINE SET 542 |
|---|---|
| VIRTUAL MACHINE SET 543 | CONTAINER SET 544 |

FIG. 5

CRYPTOGRAPHIC WORK VERIFICATION SYSTEM FOR PATTERN-BASED RISK DETECTION

TECHNICAL FIELD

The present disclosure relates generally to for cryptographic verification systems. In particular, aspects of the disclosure pertain to systems and methods for managing organizational responses to detected safety patterns.

BACKGROUND

Cryptographic verification systems are increasingly employed to document operational activities, regulatory compliance, and safety-related responses in enterprise environments such as utilities, transportation, and industrial sectors. Typical implementations rely on conventional databases for recording events, basic digital signatures for certain transactions, and, in limited pilots, distributed ledgers to anchor select records. Despite progress, these systems often operate within fragmented enterprise architectures (e.g., work order management, asset management, project scheduling platforms, etc.) each maintaining its own data model and audit mechanisms without consistent end-to-end cryptographic assurance.

Existing solutions commonly depend on mutable application logs and role-based permissions to demonstrate who performed which actions and when. This approach can result in audit trails that are susceptible to alteration, incomplete identity attribution for critical state changes, and insufficient binding between evidence artifacts (e.g., photos, GPS points) and the context in which they were created. Where blockchain components are introduced, they are frequently used in a limited or ad hoc manner, capturing partial events without a coherent chain of custody that spans initial detection, authorization, execution, and verification. As a result, organizations may face challenges producing independently verifiable records that withstand regulatory scrutiny or litigation.

While enterprise single sign-on and multi-factor authentication are widespread, they are not consistently applied to ensure cryptographic attribution of every modification to operational records, particularly in mobile field contexts. Location verification can be undermined by GPS inaccuracies or spoofing, and evidence provenance can be obscured when capture workflows do not enforce cryptographic binding of time and place. Moreover, anonymous reporting channels, when present, are sometimes intermingled with attributed verification systems which may risk privacy of users or contamination of evidentiary records.

Interoperability across heterogeneous enterprise systems remains a significant obstacle. Data exchanged via varied APIs and protocols may be transformed without preserving integrity proofs, and offline field operations can further complicate consistent state synchronization. Costs and user-experience frictions associated with distributed ledger transactions have impeded broader adoption, while reporting and analytics built on mutable data lack independent verifiability. These limitations collectively hinder the creation of cohesive, defensible records of organizational response from detection through verified completion.

BRIEF SUMMARY OF THE DISCLOSURE

Aspects of the disclosed systems and methods provide a computer-implemented method and system for enabling organizations to verify responses to detected safety patterns using cryptographic controls, structured operational workflows, and tamper-evident audit trails. One or more processors execute program instructions stored on non-transitory computer-readable media, orchestrate integrated modules for management, authentication, work order creation, field evidence processing, compliance, and analytics. These modules work in concert with hardware components such as memory, persistent storage, input/output interfaces, and network communication units.

Specifically, aspects of the disclosed systems and methods may receive pattern metadata that may include unique identifiers from detection engines or analytics platforms. Aspects of the disclosed systems and methods may have separate authentication measures based on user credentials. For example, managers may authenticate using enterprise single sign-on (SSO) and multi-factor authentication to create pattern-linked work orders with defined timeframes, geospatial boundaries, procedural tasks, and evidentiary requirements. In some aspects of the disclosed systems and methods, crew members may be authenticated through distinct flows using employee credentials and biometric verification, and then provisions device-based cryptographic wallets. Crew members may capture evidence (e.g., geolocated photos and structured field data) directly within the boundaries specified for each work order. Aspects of the disclosed systems and methods may cryptographically hash and sign each evidence artifact, store them securely off-chain, and record state updates as on-chain events in a distributed ledger.

Aspects of the disclosed system and methods may enforce geospatial validation, immediately rejecting or flagging evidence captured outside permitted locations. A compliance layer may automatically flag non-compliant work responses when submitted evidence fails integrity checks or does not meet predefined criteria. Aspects of the disclosed systems and methods may support bi-directional data synchronization with external systems, including enterprise asset management, dispatching, and project management platforms. By integrating with credentialing and compliance platforms (e.g., self-sovereign identity networks), aspects of the disclosed system and methods may verify crew qualifications, tracks performance, and maintains compliance records without compromising legal defensibility.

Analytics modules may generate operational dashboards, performance metrics, and trend reports based on cryptographically anchored records. Aspects of the disclosed systems and methods may compile exportable, verifiable evidence packages that correlate each detected pattern, work order parameters, and signed, on-chain state updates with corresponding off-chain evidence. By maintaining strict separation between anonymous reporting channels and attributed work verification, aspects of the disclosed system and methods may ensure privacy and preserve the integrity of security-sensitive information.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto and their equivalents thereof.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 depicts a block diagram illustrating an alternate computing environment, in accordance with various embodiments of the systems and methods disclosed herein.

DETAILED DESCRIPTION

Conventional verification systems typically rely on mutable application logs and coarse role-based permissions to document operational actions, leading to weak identity attribution and audit trails that are susceptible to alteration. Evidence artifacts (e.g., photos, GPS readings) are often captured without cryptographic binding to time, location, and the specific work order context, and state changes across fragmented enterprise platforms are not consistently tied back to the originating safety signal. These deficiencies prevent a coherent, end-to-end chain of custody from initial pattern detection through verified completion, complicate regulatory reporting and litigation defense, and risk privacy leakage when anonymous reporting data is intermingled with attributed verification records.

Embodiments of the present invention address these problems by implementing a pattern-triggered, dual role-dependent authentication method with user-specific cryptographic wallets and immutable ledger anchoring. A first authenticated user (e.g., a manager) generates a pattern-linked work order using received pattern metadata with a unique pattern identifier and specified temporal, geospatial, procedural, and evidentiary parameters. A second authenticated user (e.g., a crew member) performs tasks under that work order, and each state update is a wallet-signed modification recorded as an on-chain event on a distributed ledger, while corresponding collected evidence is cryptographically hashed and stored securely off-chain with references to the on-chain transaction. Embodiments of the present invention may enforce geospatial tolerance checks during evidence capture and may reject noncompliant evidence, and may compile an exportable evidence package containing pattern metadata, the pattern-linked work order, and the wallet-signed, on-chain-anchored state updates with off-chain evidence references.

These embodiments improve the functioning of the computer by transforming verification from mutable, log-based tracking into a deterministic, append-only event model that reduces resource consumption and reconciliation overhead across systems. Cryptographic wallets and signature verification at every state transition enforce hardware and protocol-level integrity checks. Indexing records by unique pattern identifiers and ledger transaction IDs enables efficient, tamper-evident retrieval. Secure off-chain storage that can be verified by on-chain references optimizes resource utilization and query performance. Edge-side hashing and geofence validation reduce bandwidth consumption and processing contention. Collectively, the architecture enhances reliability, data integrity, and auditability of the computing system itself, independent of user actions, by enforcing verifiable state transitions and immutable chain-of-custody.

Figure 1:
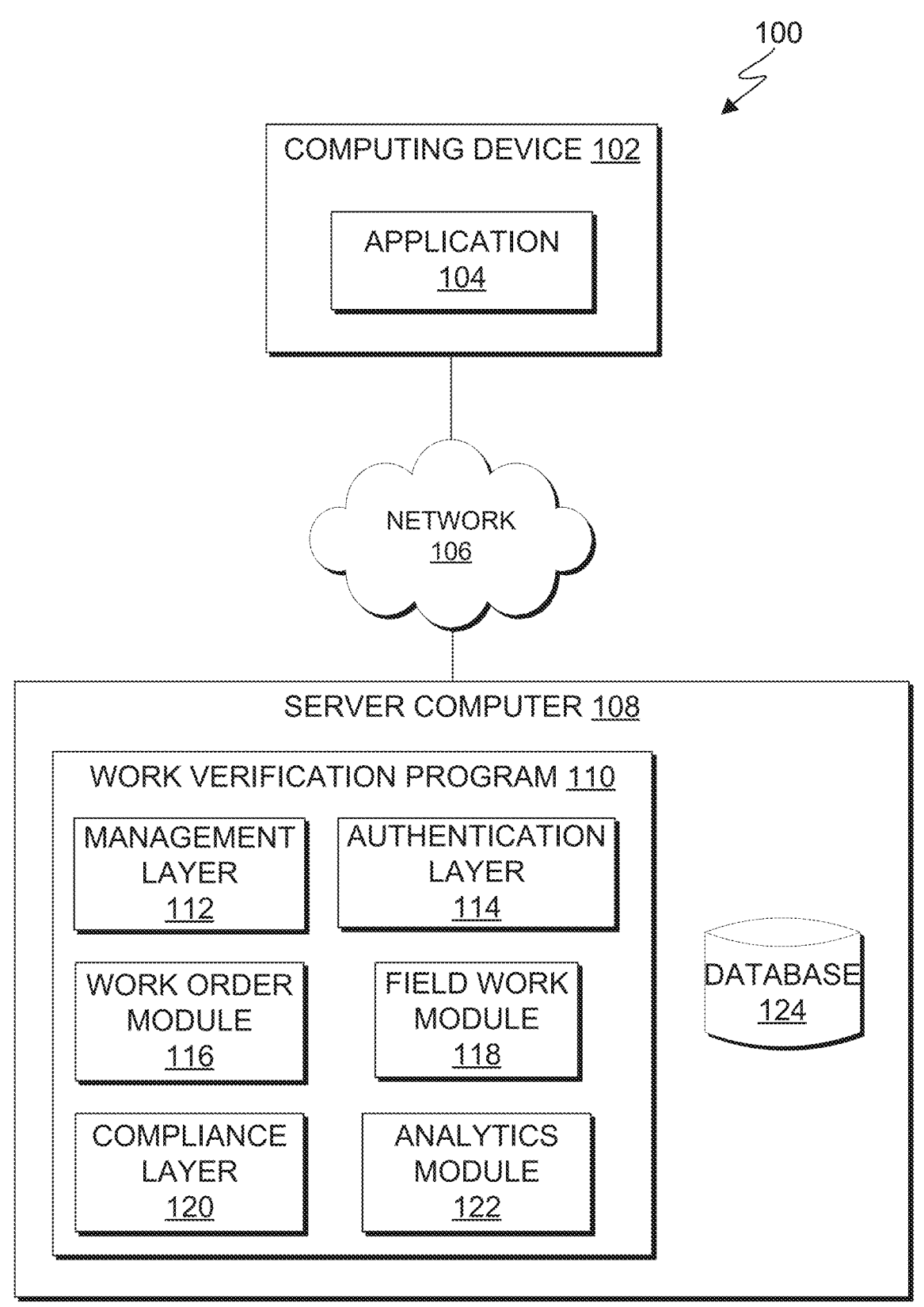
FIG. 1 functional block diagram illustrating a computing environment, in accordance with various embodiments of the systems and methods disclosed herein.

FIG. 1 is a functional block diagram illustrating an example computing environment, generally designated computing environment 100, in accordance with various embodiments of the systems and methods disclosed herein. FIG. 1 provides only an illustration of one implementation and does not imply any limitations with regard to the environments in which different embodiments may be implemented. Many modifications to the depicted environment may be made by those skilled in the art without departing from the scope of the various aspects of systems and methods disclosed herein, as recited by the claims.

Computing environment 100 includes computing device 102 and server computer 108, all interconnected over network 106. Computing device 102 and server computer 108 can be a standalone computer device, a management server, a webserver, a mobile computing device, or any other electronic device or computing system capable of receiving, sending, and processing data. In other embodiments, computing device 102 and server computer 108 can represent a server computing system utilizing multiple computers as a server system, such as in a cloud computing environment, as depicted and described in further detail with respect to FIG. 4. In another embodiment, computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, computing device 102 and server computer 108 each represent a computing system utilizing clustered computers and components (e.g., database server computers, application server computers, etc.) that act as a single pool of seamless resources when accessed within computing environment 100. In some embodiments, computing device 102 and server computer 108 are a single device. Computing device 102 and server computer 108 may include internal and external hardware components capable of executing machine-readable program instructions, as depicted and described in further detail with respect to FIG. 4.

Computing device 102 is a digital device associated on or more entities utilizing an asset management system and users thereof. Computing device 102 includes application 104. Application 104 communicates with server computer 108 to access work verification program 110 (e.g., using TCP/IP) and database 124. Application 104 can further communicate with work verification program 110 to create and verify pattern-linked work orders from received pattern metadata using dual role-dependent authentication, as discussed in greater detail below. In general, application 104 can be implemented using a browser and web portal or any program that can interface with or otherwise access work verification program 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among computing device 102 and server computer 108, and other computing devices (not shown) within computing environment 100.

Server computer 108 is a digital device that hosts work verification program 110 and database 124. In this embodiment, work verification program 110 and database 124 reside on server computer 108. In other embodiments, work verification program 110 and/or database 124 can be stored locally on computing device 102. Other embodiments include work verification program 110 and/or database 124 being local to or virtually part of computing device 108. In yet other embodiments, an instance of work verification program 110 and/or database 124 can be stored on computing device 102 and can communicate with another instance of work verification program 110 residing on server computer 108. In some embodiments, work verification program 110 can be a stand-alone program on a computing device. In certain aspects of the systems and methods disclosed herein, work verification program 110 and database 124 can be cloud based, utilizing multiple computing devices, made available as a software as a service (Saas), as part of an infrastructure as a service (laaS) system, as part of a platform as a service (PaaS), etc.

Work verification program 110 creates and verifies pattern-linked work orders from received pattern metadata using dual role-dependent authentication. by orchestrating a pattern-triggered, dual role-dependent workflow with immutable auditability. Work verification program 110 may implement high-availability architecture to achieve enterprise-grade reliability for verification functions. In this embodiment, work verification program 110 may employ infrastructure redundancy (e.g., cloud orchestration with virtual machine/container sets, gateway failover, remote server/database replication), blockchain-anchored data that prevents loss or corruption of audit records, and offline operation for field users that hashes and queues evidence for later synchronization.

For example, work verification program 110 may receive pattern metadata for a detected pattern, including a unique pattern identifier. A detected pattern may refer to one or more identified clusters of risks for a geographic area and potential failures of equipment. In some embodiments, work verification program 110 may receive a detected pattern that is statistically validated indicating a wildfire risk or an active wildfire condition based on multiple source inputs. For example, work verification program 110 may receive a detected unusual cluster of equipment failure reports from several locations within a short time window.

Work verification program 110 may then authenticate, via a first authentication flow, a first user with authorization privileges to generate a pattern-linked work order specifying temporal, geospatial, procedural, and evidentiary parameters tied to the unique pattern identifier. In this embodiment, a first authentication flow may include an enterprise single sign-on (SSO) (e.g., AGOL/Active Directory) and multi-factor authentication (e.g., email, SMS, OTP, etc.). In response to a successful verification, work verification program 110 may provision a session based cryptographic wallet for signing authorization actions. Work verification program 110 may further allow a user to generate a work order for the detected pattern. As used herein, a "work order"

is a formal, trackable instruction authorizing execution of a discrete unit of work, including a unique identifier and parameters such as temporal window (e.g., required completion timeframe), geospatial boundaries (e.g., geographic boundaries and/or coordinates where the work must be performed), procedural tasks (e.g., specific tasks and/or procedures to be completed), assigned personnel/crew, required materials/tools, safety/compliance requirements, evidentiary criteria (e.g., required evidence and/or documentation for completion), cryptographic criteria (e.g., unique work order identifiers with cryptographic timestamping) and a status history (e.g., created, assigned, in-progress, completed, verified). Examples may include vegetation clearance on a defined feeder segment with GPS-bounded before/after photos, HVAC filter replacement with recorded serials and readings and photographic documentation.

Work verification program 110 links the unique pattern identifier to a work order that specifies temporal, geospatial, procedural, and evidentiary parameters, and automatically assigns the work order to one or more users (e.g., a crew). For example, after receiving pattern metadata indicating elevated risk in grid segment G-142 (unique pattern ID P-00123), work verification program 110 generates a work order with a 48-hour completion window, geospatial boundaries defined by GPS coordinates and a tolerance region, procedural tasks such as vegetation clearance and equipment inspection, and evidentiary requirements including hashed before/after photos with cryptographic timestamps and location binding, and automatically assigns the work order to Crew Alpha. In some embodiments, work verification program 110 receives a manual assignment selection and assigns the work order to the selected group of users (e.g., Crew Bravo) and assigns the work order accordingly.

Work verification program 110 further authenticates, via a second authentication flow distinct from the first, a second user to perform tasks of the pattern-linked work order. In this embodiment, work verification program 110 validates employee credentials and biometric factors (e.g., fingerprint or face), performs device attestation, and provisions a device-stored cryptographic wallet associated with the user. As tasks and evidentiary requirements are completed, work verification program 110 updates work order state via cryptographically signed modifications linked to the second user's cryptographic wallet, records each update as an on-chain event on a distributed ledger, and securely stores corresponding collected evidence off-chain with references to the on-chain transaction identifiers. Additionally, work verification program 110 provides integration and interoperability capabilities by exposing RESTful APIs for integration with existing work order management systems, crew scheduling systems, and asset management databases, and by supporting standard formats for regulatory reporting and system operability. For crew identification and assignment, program 110 supports three integration methods: (i) free text entry with manual validation, (ii) an integration API for external crew management systems, and (iii) dropdown selection from pre-configured crew lists. In certain embodiments, program 110 integrates with Primavera P6 via SOAP/REST web services APIs and XML-based data exchange to support scheduling and project management workflows.

Figure 3:
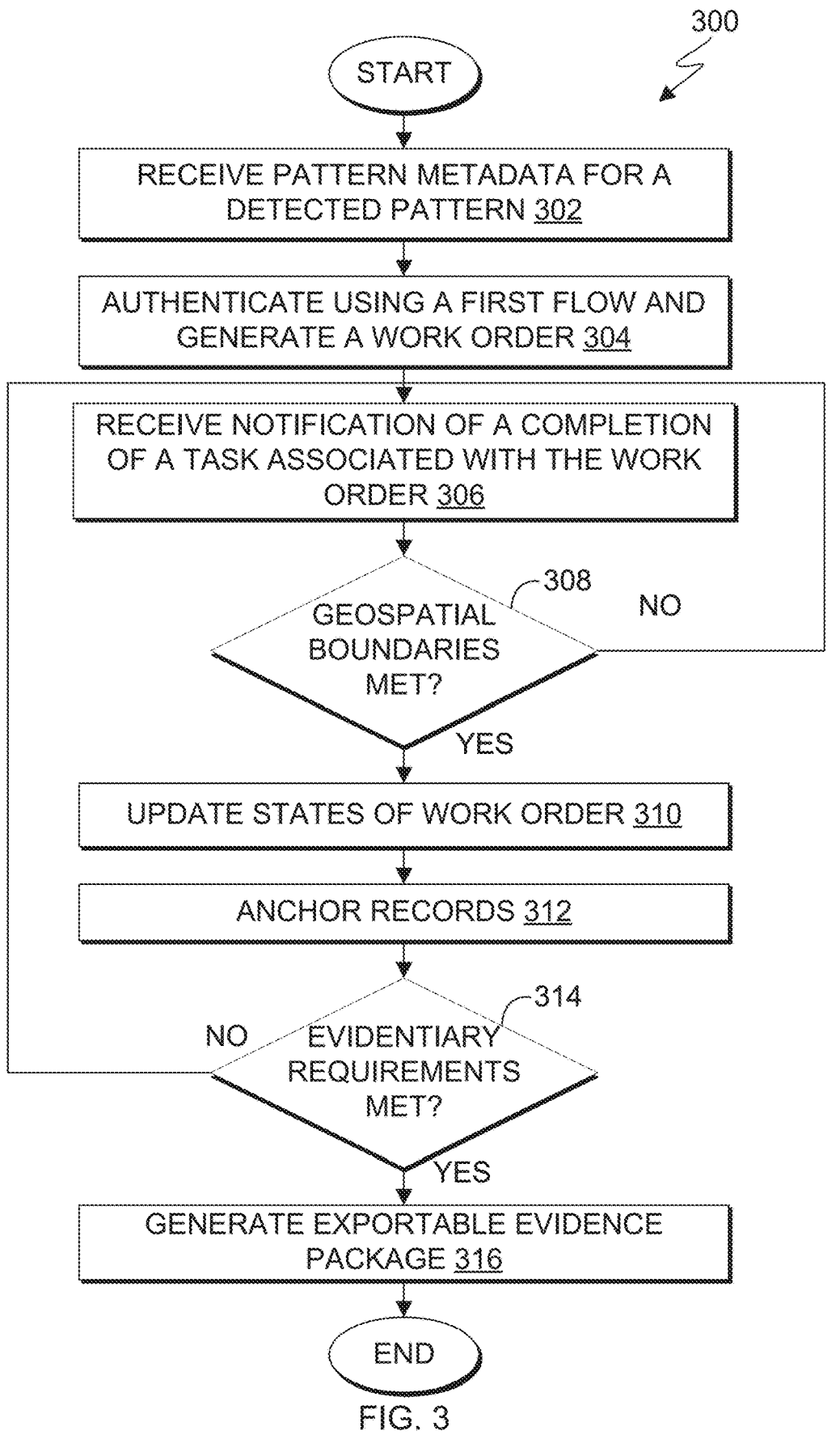
FIG. 3 is a flowchart depicting an example of operational steps for creating and verifying pattern-linked work orders from received pattern metadata using dual role-dependent authentication, in accordance with various embodiments of the systems and methods disclosed herein.

In some embodiments, work verification program 110 enforces geospatial tolerance checks during evidence capture, performs evidence hashing and time/location binding, and rejects out-of-bound artifacts to preserve evidentiary integrity as discussed in greater detail with respect to FIG. 3.

Work verification program 110 may also generate an exportable, cryptographically verifiable evidence package comprising the received pattern metadata, the pattern-linked work order with its specified parameters, and the wallet-signed, on-chain-anchored state updates with references to the corresponding off-chain evidence, thereby correlating completed work to the originating pattern and maintaining a tamper-evident chain of custody. In certain embodiments, program 110 synchronizes work order status, crew assignments, and completion data bi-directionally with external enterprise systems while preserving the unique pattern identifier and on-chain references, providing consistent, independently verifiable records for compliance and litigation support.

To maintain strict separation between anonymous reporting and attributed work verification, work verification program 110 operates as a distinct application from the anonymous reporting application with independent branding/UI, data storage, transmission pathways, cryptographic key management, and deployment/update cycles. The pattern detection engine (e.g., pattern viewer 202) generates anonymized statistical outputs (pattern metadata such as severity, location, frequency, and statistical confidence) that program 110 consumes without accessing raw anonymous reports. Work verification program 110 captures "before work" condition documentation through its own evidence capture mechanisms upon crew arrival, thereby preserving reporter anonymity and preventing cross-application data reconstruction. In certain embodiments, separate blockchain networks or isolated ledger partitions enforce cryptographic isolation while still allowing independent verification of the chain-of-custody maintained by program 110.

Work verification program 110 includes management layer 112, authentication layer 114, work order module 116, field work module 118, compliance layer 120 and analytics module 112 that may discrete roles within the overall process. As reflected below, work verification program 110 employs management layer 112 to surface pattern metadata, display severity and risk scores, and create/assign pattern-linked work orders, invokes authentication layer 114 to perform full identity attribution, biometric/GPS verification, role-based access control, and provisioning of company-sponsored cryptographic wallets, coordinates with work order module 116 to define parameters (e.g., timeframes, geospatial boundaries, procedural tasks, evidentiary requirements), track lifecycle states, prioritize and alert, and enforce tamper-proof modifications, drives field work module 118 to capture before/during/after photographic evidence with cryptographic timestamps and GPS binding, collect structured completion data, verify location within tolerance, and hash evidence for integrity, compiles exportable evidence packages, automated regulatory reports, and immutable audit trails through compliance layer 120, and provides dashboards, performance metrics, trend analysis, and pattern-to-completion correlation via analytics module 122, as discussed in greater detail with respect to FIGS. 2A and 2B.

In general, database 122 can be implemented using any non-volatile storage media known in the art. For example, database 122 can be implemented with a tape library, optical library, one or more independent hard disk drives, or multiple hard disk drives in a redundant array of independent disk (RAID). In this embodiment database 122 is stored on server computer 108. In other embodiments, database 122 can be stored on other computing devices (not shown) or can be a combination of one or more other databases that has given permission access to work verification program 110.

Figure 2A:
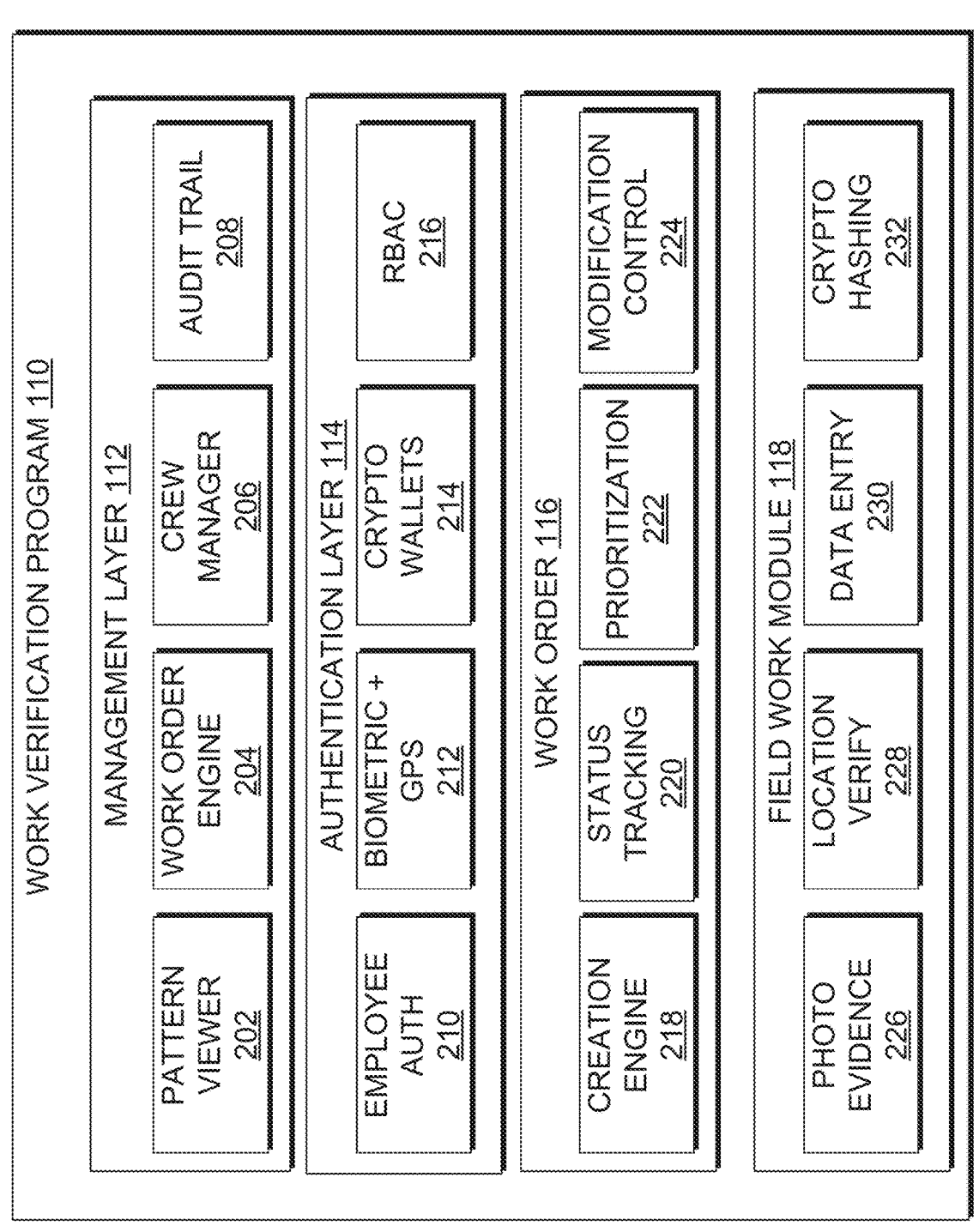
FIG. 2A illustrates an example components of a verification program, in accordance with an embodiment of the present invention.

FIG. 2A illustrates an example components of a verification program, in accordance with an embodiment of the present invention.

This example diagram illustrates components of work verification program 110. In this embodiment, work verification program 110 includes management layer 112, authentication layer 114, work order 116, and field work module 118. Management layer 112 orchestrates pattern intake, work order initiation, crew assignment, and managerial auditability. In this embodiment, work verification program 110 uses pattern viewer 202 display received pattern metadata (e.g., severity, location context, risk scores, and a unique pattern identifier) to enable improved decision making (e.g., by an authenticated user or automatically).

Work verification program 110 invokes work order engine 204 to associate the unique pattern identifier to a generated work order (e.g., to generate pattern-linked work orders) and assigns users or crews via crew manager 206. Work verification program 110 may be configured to integrate with external integration APIs (e.g., dispatch/EAM). In certain embodiments, work verification program 110 provides integration capabilities with Enterprise Asset Management (EAM) and dispatching software systems, enabling utility managers, dispatchers, and other authorized personnel to: (i) create pattern-response work orders directly from existing EAM systems (e.g., SAP, Oracle EAM, IBM Maximo, or utility-specific dispatching platforms) while maintaining cryptographic linkage to detected patterns via the unique pattern identifier; (ii) bi-directionally synchronize work order status, crew assignments, and completion data between program 110 and EAM/dispatching platforms; (iii) allow dispatchers using traditional dispatching software to assign pattern-based work orders to crews with automatic synchronization to the mobile work verification application; (iv) integrate with established EAM workflows for asset management, preventive maintenance scheduling, and resource allocation while adding cryptographic verification capabilities; and (v) preserve legacy system compatibility and existing utility business processes while enhancing legal defensibility through blockchain-anchored audit trails. In certain embodiments, program 110 also supports project management integrations (e.g., Primavera P6) via SOAP/REST web services APIs and XML-based data exchange so that activities, resource assignments, and schedule constraints remain synchronized with pattern-linked work orders.

Audit trail 208 records authorization events and assignment actions for end-to-end traceability. For example, when program 110 receives pattern P-00123 indicating elevated risk in grid segment G-142, pattern viewer 202 displays severity and risk scoring; work order engine 204 may create a work order with a 48-hour completion window and geospatial boundaries; crew manager 205 assigns Crew Alpha; and audit trail 208 logs manager authorization and the assignment transaction.

Authentication layer 114 provides full identity attribution, location assurance, wallet provisioning, and role-controlled access. Work verification program 110 authenticates managers via employee authentication module 210. In this embodiment, work verification program 110 may authenticate a first user (e.g., a manager) utilizing enterprise SSO and MFA to authorize work order creation, and authenticates crew users via employee credentials combined with biometric verification. Biometric+GPS module 212 verifies user presence and location within geospatial tolerance during field operations. In alternative embodiments, program 110 may integrate zero-knowledge authentication (e.g., zkLogin) by deriving a blockchain wallet deterministically from an OAuth identity (e.g., Google, Microsoft, Apple) using zero-knowledge proofs of JWT possession. Transactions are signed via zero-knowledge proofs rather than traditional private keys, eliminating user-side key management while maintaining full attribution to corporate identity systems. Work verification program 110 may also leverage *SUI* ecosystem integrations (e.g., SEAL SDK) to enable native sponsored transactions, increased on-chain data processing, and object-centric transaction structures, while retaining strict separation between anonymous reporting wallets and attributed work verification wallets. In some embodiments, authenticated crews may verify work completion without individual attribution (e.g., crew ID XYZ completed work at location). In certain embodiments, work verification program 110 may integrate with third-party credentialing and compliance platforms (e.g., self-Sovereign Identity systems, professional rating services, or decentralized reputation networks) to verify crew qualifications, track performance metrics, and maintain compliance records. Such integration may leverage existing credential verification protocols while maintaining the cryptographic audit trail and legal defensibility features of the disclosed system.

In certain embodiments, work verification program 110 implements a zero-knowledge authentication flow (zkLogin) that leverages enterprise OAuth providers for identity while preserving privacy. Work verification program 110 authenticates a user with an OAuth provider (e.g., Google SSO, Microsoft 365, Apple), obtains a JSON Web Token (JWT) from the provider, and generates a zkSNARK-based proof that demonstrates possession of a valid JWT without revealing its contents. Work verification program 110 derives a blockchain wallet address deterministically from the authenticated OAuth identity combined with an application-specific salt, and signs transactions using zero-knowledge proofs in lieu of traditional private keys. This approach eliminates user-side private key management while maintaining full attribution to corporate identity systems for auditability and revocation.

In these zkLogin embodiments, work verification program 110 enhances privacy and operational resilience by avoiding biometric data storage in the authentication flow, producing cryptographic proof of identity without exposing personal information, and enabling recovery through the OAuth provider rather than seed phrases or private key backup. Company-sponsored transaction models described herein remain applicable, with all gas fees paid by the organization and wallet funding handled automatically. Work verification program 110 maintains strict separation between anonymous reporting and attributed work verification, preserves ledger anchoring and off-chain evidence references for chain-of-custody, and supports deterministic wallet consistency across devices following OAuth login, thereby providing a zero-friction, enterprise-grade authentication path consistent with the dual role-dependent architecture.

Work verification program 110 may provision user-specific cryptographic wallets using crypto wallets module 214 with company-sponsored transactions and enforces role-based access control through role based access control (RBAC) 216 to constrain actions to authorized roles. Continuing the example, work verification program 110 authenticates the manager to sign the creation of the G-142 work order using a session wallet, then authenticates Crew Alpha members with biometrics and provisions device-stored wallets to sign task-completion state updates tied to pattern P-00123. Work verification program 110 provisions user-specific cryptographic wallets in a manner that eliminates blockchain fee friction for end users. In particular, work verification program 110 implements a company-sponsored transaction model in which the organization pays all gas fees for on-chain events, automatically funds wallets without user intervention, and provides administrative transaction monitoring and budget controls with per-user cost tracking. Work verification program 110 may then automatically generate session-based wallets for desktop managers and device-stored wallets for mobile crew members upon successful authentication, enforce secure private key storage (e.g., secure enclaves/HSMs); support automatic key rotation, and provide backup and recovery mechanisms to maintain business continuity. In all embodiments, wallet infrastructures for the anonymous reporting system and the attributed work verification system remain separate to prevent cross-contamination of identities and records.

Work order module 116 defines parameters and governs lifecycle management, prioritization, and tamper-proof modifications. Work verification program 110 uses the creation engine 218 to specify temporal windows for the generated work order, geospatial boundaries (with tolerance regions), procedural tasks, and evidentiary requirements. Status tracking 220 tracks different states associated with the work order (e.g., created, assigned, in-progress, completed, and verified states). Prioritization 222 applies risk scoring and alerts to meet service-level objectives, while modification control 224 requires cryptographic signatures on all changes and maintains immutable change history. In the running example, work verification program 110 sets G-142 vegetation clearance and equipment inspection tasks, enforces before/during/after photo requirements, prioritizes the order based on risk scoring, and records each status transition as a wallet-signed modification linked to Crew Alpha's device wallets.

Work verification program 110 enforces RBAC to prevent unauthorized work order creation and unauthorized modification of completed work records. Only authenticated users with appropriate roles may authorize pattern-linked work orders, and only the authenticated, wallet-provisioned field users may submit or alter task-completion state updates. Program 110 requires wallet-signed updates for any change to work order states, thereby maintaining integrity and preserving a tamper-evident audit history.

Field work module 118 executes evidence capture, location verification, structured documentation, and integrity hashing. Work verification program 110 captures photographic evidence (e.g., before/during/after) with cryptographic timestamps. Location verify module 228 verifies location against geospatial boundaries and applies anti-spoofing checks, collects structured completion data via data entry 230, and computes hashes over evidence through crypto hashing 232 to establish immutable chain-of-custody. If the device falls outside the tolerance region, program 110 rejects or flags the submission. In the example, Crew Alpha arrives at G-142, program 110 validates GPS within bounds, captures and hashes photos of cleared vegetation and inspected equipment, binds time/location to each artifact, and prepares the evidence set for ledger anchoring and off-chain storage.

Figure 2B:
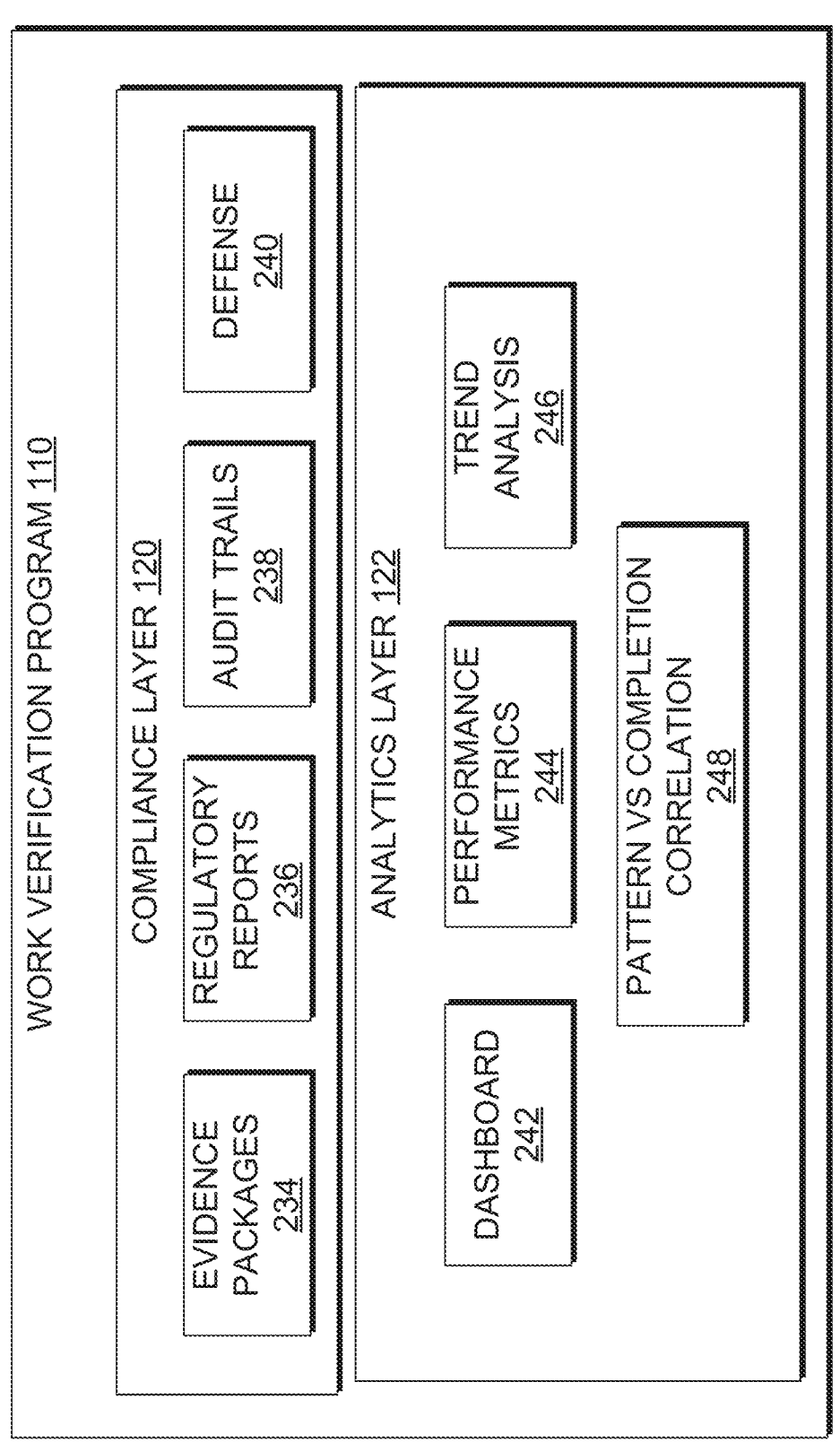
FIG. 2B illustrates additional components of a verification program, in accordance with an embodiment of the present invention.

FIG. 2B illustrates additional components of a verification program, in accordance with an embodiment of the present invention. For example, FIG. 2B includes the components of FIG. 2A in addition to the components disclosed below.

Work verification program 110 further includes compliance layer 120 and analytics layer 122. Compliance layer 120 assembles exportable evidence packages, generates automated regulatory reports, preserves immutable audit trails, and readies proofs for defense. Work verification program 110 compiles evidence packages 234 comprising the received pattern metadata, the pattern-linked work order with parameters, and the wallet-signed, on-chain-anchored state updates referencing encrypted off-chain evidence. Regulatory reports 236 produce compliance outputs aligned to reporting standards, while audit trails 238 maintain tamper-evident records across authorization, execution, and verification. Defense 240 organizes cryptographic proofs (e.g., hashes, signatures, transaction IDs) for investigations or litigation. In the example, work verification program 110 generates an evidence package for P-00123/G-142, including signed state updates and off-chain evidence references, and emits an automated compliance report indicating verified completion.

In certain embodiments, work verification program 110 may structure evidence packages and ledger records using standardized formats to support independent verification. Ledger submissions may include JSON fields such as report or evidence hash, timestamp, record type, signature data, unique pattern identifier, and GPS region metadata. Work verification program 110 may store detailed evidence (e.g., photographs and structured forms) in encrypted off-chain repositories while database entries and ledger transactions maintain cross-references via transaction identifiers and digests. Collectively, these structures establish cryptographic integrity, immutable chain-of-custody, and interoperability for regulatory reporting and litigation support.

Work verification program 110 may also support independent verification workflows for supervisors or authorized third parties through separate authentication flows. Verifiers may access cryptographically secured evidence packages, including photo artifacts, GPS data, timestamps, and crew documentation, to assess whether completed work meets the evidentiary parameters and appropriately addresses the originating pattern. Work verification program 110 may update pattern and work order status based on verified completion and, where an inadequate response is determined, can reopen or flag the work order for re-inspection and remediation while preserving the audit trail.

Analytics layer 122 delivers operational visibility and effectiveness measurement via dashboards 242, performance metrics 244, trend analysis 246, and pattern-to-completion correlation 248. Work verification program 110 presents real-time views of work order queues, status progression, and verification rates; quantifies response times and crew performance; detects recurring issues and regional trends; and correlates completed work to originating patterns to assess remediation effectiveness. In the example, program 110 displays G-142's work order status transitions, measures time-to-completion against SLA, highlights vegetation clearance trends across adjacent segments, and confirms that evidence captured by Crew Alpha satisfies the evidentiary parameters for pattern P-00123.

Work verification program 110 implements cryptographically anchored analytics that compute dashboards, performance metrics, trend analyses, and pattern-to-completion correlations on immutable, ledger-referenced records to provide independently verifiable insights. In certain embodiments, work verification program 110 employs risk-based predictive analytics using sparse-data statistical methods (e.g., Bayesian updating, sequential analysis, and confidence interval estimation) to prioritize and schedule work orders under limited data conditions. The analytics architecture supports dual streams (e.g., anonymous reporting analytics and attributed work verification analytics) and correlation analytics that measure organizational effectiveness without compromising anonymity.

FIG. 3 is a flowchart depicting an example of operational steps for creating and verifying pattern-linked work orders from received pattern metadata using dual role-dependent authentication, in accordance with various embodiments of the systems and methods disclosed herein.

In step 302, work verification program 110 receives pattern metadata for a detected pattern. In this embodiment, work verification program 110 receives pattern metadata from a pattern detection engine (e.g., pattern viewer 202) or external analytics service via a secure API. In this embodiment, the metadata may include a unique pattern identifier, severity, location, frequency, and statistical confidence. For example, program 110 ingests a JSON payload for pattern ID P-00123 indicating high severity in grid segment G-142 with a confidence score above a configurable threshold. In some embodiments, work verification program 110 may received pattern metadata that includes a risk-based prioritization level and may automatically generate and assign a work order based on the risk-based prioritization level.

In step 304, work verification program 110 authenticates a first user using a first flow and generates a work order. In this embodiment, program 110 uses enterprise single sign-on (SSO) with multi-factor authentication (MFA) to authenticate a manager, provisions a session-based cryptographic wallet, and creates a pattern-linked work order tied to the unique pattern identifier with specified temporal windows, geospatial boundaries, procedural tasks, and evidentiary requirements. For example, program 110 generates a 48-hour vegetation clearance and equipment inspection work order for grid segment G-142 requiring before, during, and after photos with GPS binding and hashed evidence.

Work verification program 110 may, as part of generating the work order, automatically assign the generated work order to one or more authorized users (e.g., a crew) based on assignment logic that evaluates the pattern's geospatial region, required procedural skills, crew availability, workload, and service-level priorities, and records the assignment as an authorization action linked to the unique pattern identifier. In other embodiments, work verification program 110 presents a selectable dropdown menu of authorized crews filtered by role permissions and proximity to the work site; upon receiving a manual selection, work verification program 110 assigns the work order to the selected crew and records the assignment in the audit trail.

Following assignment, work verification program 110 may authenticate the crew user via a second authentication flow distinct from the manager flow by validating employee credentials and biometric factors (e.g., fingerprint or facial recognition) and performing device attestation. In response to a successful verification, work verification program 110 provisions a device-stored cryptographic wallet bound to the authenticated user, enforces role-based permissions for task execution, and requires that all task-completion actions and state updates be signed with the provisioned wallet. In this manner, work verification program 110 may attribute field activities to the specific crew user and enable immutable linkage to the pattern-linked work order.

In step 306, work verification program 110 receives a notification of a completion of a task associated with the work order. In this embodiment, verification program 110 receives a device-originated event from the second user's application indicating task completion, including structured form data and references to captured evidence. For example, program 110 ingests a signed "task complete" message for "equipment inspection" with photo hashes, timestamps, and preliminary location data. In some embodiments, crews may need to reauthenticate before submitting a status change (e.g., completion of a task with the work order).

In step 308, work verification program 110 determines whether geospatial boundaries are met. In this embodiment, program 110 verifies the device's GPS coordinates and tolerance region against the work order's geospatial boundaries, applies anti-spoofing checks, and binds the location to the evidence record. For example, program 110 confirms the reported coordinates fall within the defined corridor for grid segment G-142 and associates the validated location with the submitted photo hashes.

In certain embodiments, work verification program 110 may determine whether geospatial boundaries are met prior to enabling capture actions for a generated work order. In other words, in certain embodiments, work verification program 110 may determine whether geospatial boundaries for an associated work order is met before enabling the device and associated components thereof (e.g., camera and data entry interfaces) or allowing initiation of task execution. In this embodiment, work verification program 110 may validate the device's current GPS coordinates against the work order's geospatial boundaries and tolerance region, performs device attestation and anti-spoofing checks, and issues a location-bound capture token that binds subsequent evidence artifacts (e.g., photos and structured entries) to the validated coordinates and a cryptographic timestamp. If the device is outside the permitted region, work verification program 110 disables evidence capture, presents guidance to navigate into bounds. In embodiments where the device is offline, work verification program 110 may queue submissions as pending until location validation succeeds, with optional administrative override requiring recorded justification and revalidation upon reentry.

If, in step 308, work verification program 110 determines that geospatial boundaries are not met, then processing returns to step 306 until work verification program 110 determines that geospatial boundaries are met. In this embodiment, program 110 rejects or flags the out-of-bounds evidence, issues a corrective notification, and awaits a subsequent task completion event from the field user within the permitted geospatial tolerance.

If, in step 308, work verification program 110 determines that geospatial boundaries are met, then, in step 310, work verification program 110 updates the states of the work order. In this embodiment, program 110 records a cryptographically signed modification linked to the second user's device-stored wallet and advances the work order state (e.g., from in-progress to completed for the specific task). For example, work verification program 110 persists a signed "inspection completed" state update associated with pattern ID P-00123 and the work order's unique identifier.

In step 312, work verification program 110 anchors records. In this embodiment, program 110 posts an on-chain event to a distributed ledger containing the signed state update, the unique pattern identifier, and a transaction identifier that references encrypted off-chain evidence, while storing the detailed evidence in secure off-chain storage. For example, work verification program 110 writes a ledger transaction with the manager and crew signatures and stores the photo artifacts and structured forms in encrypted storage linked by the transaction ID.

In step 314, work verification program 110 determines whether evidentiary requirements are met. In this embodiment, program 110 checks that required artifacts (e.g., before, during, and after photos, structured data fields, timestamps, and hashes) are present, valid, and correlated to the originating pattern and work order parameters. For example, program 110 verifies that the vegetation clearance includes both "before" and "after" photo hashes with GPS binding and that the structured form entries meet the specified compliance fields.

If, in step 314, work verification program 110 determines that evidentiary requirements are not met, then processing reverts to step 306 until such time that work verification program 110 determines that evidentiary requirements are met. In this embodiment, program 110 issues an alert to the field user indicating the missing or invalid evidence elements and awaits a subsequent completion event with corrected submissions.

If, in step 314, work verification program 110 determines that evidentiary requirements are met, then, in step 316, work verification program 110 generates an exportable evidence package. In this embodiment, program 110 compiles the received pattern metadata, the pattern-linked work order with its specified parameters, and the wallet-signed, on-chain-anchored state updates with references to the corresponding off-chain evidence into a cryptographically verifiable package suitable for regulatory reporting and litigation support. For example, work verification program 110 outputs a signed evidence bundle for pattern ID P-00123 that includes the work order record, transaction IDs, evidence hashes, and compliance confirmations.

In some embodiments, work verification program 110 may supports crew-level attribution without individual identification for completion verification. For example, where privacy or labor policy constraints apply, program 110 may attribute completion to an authorized crew identifier (e.g., "Crew XYZ") while maintaining cryptographic linkage to the work order and pattern identifier and preserving the immutable audit trail. In such embodiments, work verification program 110 continues to enforce evidentiary requirements, geospatial validation, and ledger anchoring of state updates with references to encrypted off-chain evidence.

Figure 4:
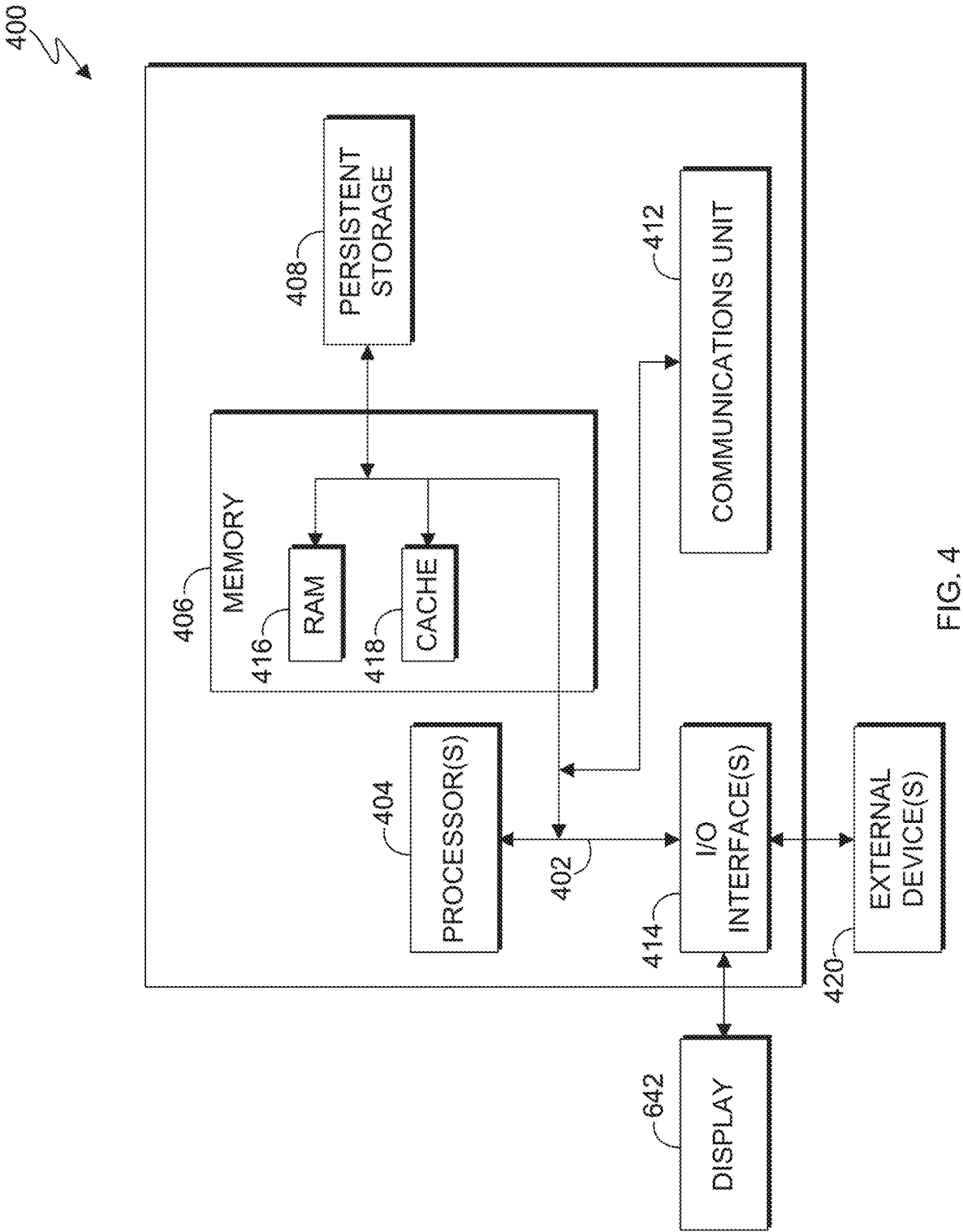
FIG. 4 depicts a block diagram of components of the computing systems of FIG. 1, in accordance with various embodiments of the systems and methods disclosed herein.

FIG. 4 depicts a block diagram of components of computing systems within computing environment 100 of FIG. 1, in accordance with an aspect of the systems and methods of the present disclosure. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment. However, it should be appreciated that any particular program nomenclature herein is used merely for convenience, and thus aspects of the systems and methods disclosed herein should not be limited to use solely in any specific application identified and/or implied by such nomenclature.

Computer system 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Work verification program 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 610 includes one or more network interface cards. Communications unit 410 may provide communications through the use of either or both physical and wireless communications links. Work verification program 110 may be downloaded to persistent storage 408 through communications unit 410.

I/O interface(s) 412 allows for input and output of data with other devices that may be connected to computing device 102 and server computer 108. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice aspects of the present disclosure can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Aspects of the various systems and methods may be a system, a method, and/or a computer program product (CPP). Various aspects of the disclosure are described by narrative text, flowcharts, block diagrams of computer systems and/or block diagrams of the machine logic included in computer program product embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Aspects of the systems and methods of the present disclosure are described herein with reference to flowchart illustrations and/or block diagrams of methods, apparatus (systems), and computer program products according to aspects of the various systems and methods disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the systems and methods of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the systems and methods of the present disclosure have been presented for purposes of illustration but are not intended to be exhaustive or limited to the embodiments disclosed. Many modifications and variations will be apparent to those of ordinary skill in the art without departing from the scope and spirit of aspects of the present disclosure. The terminology used herein was chosen to best explain the principles of the embodiment, the practical application or technical improvement over technologies found in the marketplace, or to enable others of ordinary skill in the art to understand the embodiments disclosed herein.

FIG. 5 depicts an alternate computing environment 500 illustrating components of computer 501 in accordance with an alternate embodiment. It should be appreciated that FIG. 5 provides only an illustration of one implementation and does not imply any limitations with regard to the environments in which different embodiments may be implemented. Many modifications to the depicted environment may be made.

Computing environment 500 contains an example of an environment for the execution of at least some of the computer code involved in performing the inventive methods, such as for verifying organizational responses to detected safety patterns using role-dependent authentication with user-specific cryptographic wallets and immutable blockchain-anchored audit trails.

In addition to work verification program 110, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and work verification program 110, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip". In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in member key program 510 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 712 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in work verification program 110 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Work verification program 110 is a program, a subprogram of a larger program, an application, a plurality of applications, or mobile application software, which functions for verifying organizational responses to detected safety patterns using role-dependent authentication with user-specific cryptographic wallets and immutable blockchain-anchored audit trails. In various embodiments, work verification program 110 may implement the following steps: receiving pattern metadata for a detected pattern, the metadata including a unique pattern identifier; authenticating, via a first authentication flow, a first user with authorization privileges and generating, based on the received pattern metadata, a work order associated with the detected pattern and linked to the unique pattern identifier, the work order specifying temporal, geospatial, procedural, and evidentiary parameters; authenticating, via a second authentication flow distinct from the first authentication flow, a second user to perform tasks of the work order associated with the detected pattern; updating states of the work order as the tasks and evidentiary requirements are completed, wherein updates are reflected as a cryptographically signed modification linked to a cryptographic wallet of the second user and recorded as an on-chain event on a distributed ledger while storing corresponding collected evidence in secure off-chain storage referenced by the on-chain event; and generating an exportable, cryptographically verifiable evidence package comprising the received pattern metadata, the pattern-linked work order with its specified parameters, and the wallet-signed, on-chain-anchored state updates with references to the corresponding off-chain evidence. In another embodiment, the functionality of work verification program 110, or any combination programs thereof, may be integrated into a single software program. In some embodiments, work verification program 110 may be located on separate computing devices (not depicted) but can still communicate over WAN 502. In various embodiments, client versions of work verification program 110 resides on any other computing device (not depicted) within computing environment 500. In the depicted embodiment, work verification program 110 includes model 552 and can leverage model 552 to monitor a plurality of assets for compliance with asset related documentation and detecting a change to the one or more assets of the plurality that deviate from parameters associated with the asset related documentation.

Model 552 is representative of a model utilizing deep learning techniques to train, calculate weights, ingest inputs, and output a plurality of solution vectors. In an embodiment, model 552 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 552 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 552 is a recurrent neural network (RNN) trained utilizing supervised training methods.

Aspects of the present disclosure may contain various accessible data sources, such as database 554, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Work verification program 110 may provide informed consent, with notice of the collection of personal data, allowing the user to opt in or opt out of processing personal data. Consent can take several forms: opt-in consent imposes on the user to take an affirmative action before the personal data is processed, alternatively, opt-out consent imposes on the user to take an affirmative action to prevent the processing of personal data before the data is processed. Work verification program 110 enables the authorized and secure processing of user information, such as tracking information, as well as personal data, such as personally identifying information or sensitive personal information. Work verification program 110 may provide information regarding the personal data and the nature (e.g., type, scope, purpose, duration, etc.) of the processing. Work verification program 110 may provide the user with copies of stored personal data. Work verification program 110 may allow the correction or completion of incorrect or incomplete personal data. Work verification program 110 may allow the immediate deletion of personal data.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method for verifying organizational responses to detected safety patterns using role-dependent authentication with user-specific cryptographic wallets and immutable blockchain-anchored audit trails, the computer-implemented method being performed by one or more processors programmed with program instructions which, when executed, cause the one or more processors to perform the steps of:

receiving pattern metadata for a detected pattern, the pattern metadata including a unique pattern identifier;

authenticating, via a first authentication flow, a first user with authorization privileges and generating, based on the received pattern metadata, a work order associated with the detected pattern and linked to the unique pattern identifier, the work order specifying temporal, geospatial, procedural, and evidentiary parameters;

authenticating, via a second authentication flow distinct from the first authentication flow, a second user to perform tasks of the work order associated with the detected pattern;

updating states of the work order as the tasks and evidentiary requirements are completed, wherein updates are reflected as a cryptographically signed modification linked to a cryptographic wallet of the second user and recorded as an on-chain event on a distributed ledger while storing corresponding collected evidence in secure off-chain storage referenced by the on-chain event; and generating an exportable, cryptographically verifiable evidence package comprising the received pattern metadata, the work order with its specified parameters associated with the detected pattern, and the cryptographically signed modification linked to the cryptographic wallet.

2. The computer-implemented method of claim 1, wherein authenticating the second user comprises employee credentials combined with biometric verification and provisioning a device-stored cryptographic wallet for signing work completion actions.

3. The computer-implemented method of claim 1, wherein authenticating the first user comprises enterprise single sign-on (SSO) and multi-factor authentication and provisioning a session-based cryptographic wallet for signing authorization actions.

4. The computer-implemented method of claim 1, further comprising:

capturing, by the second user, work completion evidence comprising at least photo documentation and structured data; and cryptographically hashing the work completion evidence.

5. The computer-implemented method of claim 1, further comprising:

automatically flagging inadequate work responses when a correlation between completed work and the detected pattern fails predetermined compliance criteria or when evidence integrity checks fail.

6. The computer-implemented method of claim 1, further comprising:

verifying that a device associated with the second user that is capturing evidence of completion of a task of the work order is within geographic boundaries of a specified tolerance region with specified boundaries;

determining that the device associated with the second user is outside the geographic boundaries; and in response to determining that the device associated with the second user is outside the geographic boundaries, rejecting evidence generated outside the specified tolerance region.

7. The computer-implemented method of claim 1, further comprising:

bi-directionally synchronizing work order status, crew assignments, and completion data with external enterprise systems selected from the group consisting of enterprise asset management systems, dispatching platforms, project management systems, and geographic information systems.

8. A computer program product comprising one or more non-transitory computer readable media storing program instructions for verifying organizational responses to detected safety patterns using role-dependent authentication with user-specific cryptographic wallets and immutable blockchain-anchored audit trails, the program instructions which, when executed by one or more processors, cause the one or more processors to:

receive pattern metadata for a detected pattern, the pattern metadata including a unique pattern identifier;

authenticate, via a first authentication flow, a first user with authorization privileges and generating, based on the received pattern metadata, a work order associated with the detected pattern and linked to the unique pattern identifier, the work order specifying temporal, geospatial, procedural, and evidentiary parameters;

authenticate, via a second authentication flow distinct from the first authentication flow, a second user to perform tasks of the work order associated with the detected pattern;

update states of the work order as the tasks and evidentiary requirements are completed, wherein updates are reflected as a cryptographically signed modification linked to a cryptographic wallet of the second user and recorded as an on-chain event on a distributed ledger while storing corresponding collected evidence in secure off-chain storage referenced by the on-chain event; and generate an exportable, cryptographically verifiable evidence package comprising the received pattern metadata, the work order with its specified parameters associated with the detected pattern, and the cryptographically signed modification linked to the cryptographic wallet.

9. The computer program product of claim 8, wherein authenticating the second user comprises employee credentials combined with biometric verification and provisioning a device-stored cryptographic wallet for signing work completion actions.

10. The computer program product of claim 8, wherein authenticating the first user comprises enterprise single sign-on (SSO) and multi-factor authentication and provisioning a session-based cryptographic wallet for signing authorization actions.

11. The computer program product of claim 8, wherein the one or more processors executing the program instructions are further caused to:

capture, by the second user, work completion evidence comprising at least photo documentation and structured data; and cryptographically hash the work completion evidence.

12. The computer program product of claim 8, wherein the one or more processors executing the program instructions are further caused to:

automatically flag inadequate work responses when a correlation between completed work and the detected pattern fails predetermined compliance criteria or when evidence integrity checks fail.

13. The computer program product of claim 8, wherein the one or more processors executing the program instructions are further caused to:

verify that a device associated with the second user that is capturing evidence of completion of a task of the work order is within geographic boundaries of a specified tolerance region with specified boundaries;

determine that the device associated with the second user is outside the geographic boundaries; and in response to determining that the device associated with the second user is outside the geographic boundaries, reject evidence generated outside the specified tolerance region.

14. The computer program product of claim 8, wherein the one or more processors executing the program instructions are further caused to:

bi-directionally synchronize work order status, crew assignments, and completion data with external enterprise systems selected from the group consisting of enterprise asset management systems, dispatching platforms, project management systems, and geographic information systems.

15. A computer system for verifying organizational responses to detected safety patterns using role-dependent authentication with user-specific cryptographic wallets and immutable blockchain-anchored audit trails, the computer system comprising:

one or more processors;

one or more computer-readable storage media; and program instructions stored on the one or more computer-readable storage media that, when executed by the one or more processors, cause the one or one or more processors to:

receive pattern metadata for a detected pattern, the pattern metadata including a unique pattern identifier;

authenticate, via a first authentication flow, a first user with authorization privileges and generating, based on the received pattern metadata, a work order associated with the detected pattern and linked to the unique pattern identifier, the work order specifying temporal, geospatial, procedural, and evidentiary parameters;

authenticate, via a second authentication flow distinct from the first authentication flow, a second user to perform tasks of the work order associated with the detected pattern;

update states of the work order as the tasks and evidentiary requirements are completed, wherein updates are reflected as a cryptographically signed modification linked to a cryptographic wallet of the second user and recorded as an on-chain event on a distributed ledger while storing corresponding collected evidence in secure off-chain storage referenced by the on-chain event; and generate an exportable, cryptographically verifiable evidence package comprising the received pattern metadata, the work order with its specified parameters associated with the detected pattern, and the cryptographically signed modification linked to the cryptographic wallet.

16. The computer system of claim 15, wherein authenticating the second user comprises employee credentials combined with biometric verification and provisioning a device-stored cryptographic wallet for signing work completion actions.

17. The computer system of claim 15, wherein authenticating the first user comprises enterprise single sign-on (SSO) and multi-factor authentication and provisioning a session-based cryptographic wallet for signing authorization actions.

18. The computer system of claim 15, wherein the one or more processors executing the program instructions are further caused to:

capture, by the second user, work completion evidence comprising at least photo documentation and structured data; and cryptographically hash the work completion evidence.

19. The computer system of claim 15, wherein the one or more processors executing the program instructions are further caused to:

automatically flag inadequate work responses when a correlation between completed work and the detected pattern fails predetermined compliance criteria or when evidence integrity checks fail.

20. The computer system of claim 15, wherein the one or more processors executing the program instructions are further caused to:

verify that a device associated with the second user that is capturing evidence of completion of a task of the work order is within geographic boundaries of a specified tolerance region with specified boundaries;

determine that the device associated with the second user is outside the geographic boundaries; and in response to determining that the device associated with the second user is outside the geographic boundaries, reject evidence generated outside the specified tolerance region.

\* \* \* \* \*